United States Patent
Lanzone et al.

(10) Patent No.: US 7,936,663 B2
(45) Date of Patent: May 3, 2011

(54) PROTECTION OF CLEAR CHANNEL CONNECTIONS IN COMMUNICATIONS NETWORKS

(75) Inventors: Sergio Lanzone, Genoa (IT); Orazio Toscano, Genoa (IT)

(73) Assignee: Ericsson AB, Stockholm (SE)

( * ) Notice: Subject to any disclaimer, the term of this patent is extended or adjusted under 35 U.S.C. 154(b) by 949 days.

(21) Appl. No.: 10/486,464

(22) PCT Filed: Aug. 9, 2002

(86) PCT No.: PCT/IB02/03665
§ 371 (c)(1),
(2), (4) Date: Jul. 16, 2004

(87) PCT Pub. No.: WO03/015321
PCT Pub. Date: Feb. 20, 2003

(65) Prior Publication Data
US 2004/0233842 A1 Nov. 25, 2004

(30) Foreign Application Priority Data
Aug. 10, 2001 (IT) .............................. MI2001A1779

(51) Int. Cl.
*H04L 12/26* (2006.01)
(52) U.S. Cl. ....................................... 370/216; 370/225
(58) Field of Classification Search .................. None
See application file for complete search history.

(56) References Cited

U.S. PATENT DOCUMENTS

| | | | | |
|---|---|---|---|---|
| 5,706,277 A * | 1/1998 | Klink | ............................. | 370/220 |
| 5,712,847 A * | 1/1998 | Hata | .............................. | 370/228 |
| 5,745,476 A * | 4/1998 | Chaudhuri | ..................... | 370/222 |
| 5,870,403 A * | 2/1999 | Egoshi | ........................... | 370/228 |
| 5,936,938 A * | 8/1999 | Weldon et al. | ................. | 370/228 |
| 6,009,076 A * | 12/1999 | Takatsu et al. | ................ | 370/227 |
| 6,163,526 A * | 12/2000 | Egoshi | ........................... | 370/228 |
| 6,526,021 B1 * | 2/2003 | Dempsey | ....................... | 370/227 |
| 6,614,753 B2 * | 9/2003 | Ikawa | ............................ | 370/222 |
| 6,680,905 B1 * | 1/2004 | Ishikawa | ........................ | 370/228 |
| 6,741,553 B1 * | 5/2004 | Grenier | ......................... | 370/218 |
| 6,907,006 B1 * | 6/2005 | Sakamoto et al. | ........... | 370/236.2 |
| 7,096,275 B1 * | 8/2006 | Doshi et al. | .................... | 709/238 |
| 7,158,540 B1 * | 1/2007 | Stiles et al. | ..................... | 370/498 |
| 7,167,442 B2 * | 1/2007 | Courtney et al. | ............. | 370/217 |
| 7,426,179 B1 * | 9/2008 | Harshavardhana et al. | .. | 370/219 |

OTHER PUBLICATIONS

*Series G: Transmission Systems and Media, Digital Systems and Networks Types and Characteristics of SDH Network Protection Architectures*, ITU-T Recommendation G.841, Oct. 1998, complete section.

* cited by examiner

Primary Examiner — Steven H Nguyen
(74) Attorney, Agent, or Firm — Kirschstein, et al.

(57) ABSTRACT

A method for protection of STM-n/OC-n clear channel connections calls for a protection diagram allowing protection of STM-n/OC-n clear channel signals transmitted from a source point to a destination point. This protection allows overcoming a fall along the path between source point and destination point. It can be used in different types of network structure, for example "ring" or "mesh". The method calls for duplication of STM-n/OC-n signals at the transmitting end of the subnetwork and transmission over two different routes which can be defined as work and protection paths. To ensure success of the protection diagram the work and protection channels follow different routes. At the receiving end, the signal is selected from the work path or the protection path depending on the quality of the received signals, the protection state and the external commands.

16 Claims, 1 Drawing Sheet

PROTECTION OF CLEAR CHANNEL CONNECTIONS IN COMMUNICATIONS NETWORKS

BACKGROUND OF THE INVENTION

The present invention relates to a method and to devices and subnetworks for the protection of STM-N/OC-n clear channel connections.

STM-n/OC-n clear channel interconnection is the ability of a network or network devices to interconnect an STM-n/OC-n signal as it is without processing in the case of STM-n signals, RSOH (Regeneration Section Overhead) bytes and MSOH (Multiplex Section Overhead) as defined in ITU-T specifications G.783 and G.707 (November 1995) or, in case of OC-n signals, of the Section and Line Overheads as defined in Bellcore GR-253.

Assuming connection with an STM-n/OC-n signal of two network elements (NE A and NE C) passing through a third element NE B capable of realizing only VC-n/STS-n (not clear channel) connections, NE B terminates the received STM-n/OC-n A and generates a new signal (STM-n/OC-n B) towards NE C with the same VC-n/STS-n within but with different RS/Section OH and MS/line OH.

Even if no regeneration, grooming and consolidation operations are required on an STM-n signal traversing a conventional SDH/SONET node, i.e. a Digital Cross Connect—DXC—or an Add/Drop Multiplexer—ADM—, termination of the RS/Section Overhead and possibly termination of the MS/Line Overhead with resulting interconnection at the VC-n/STS-n level are carried out nevertheless.

If the same connection is made over an NE B able to provide clear channel connections (see FIG. 2), then the STM-n/OC-n A signal generated by NE A will reach NE C without any modification.

In addition, some of the bytes of RS/Section OH and MS/line OH could be used for end-to-end transportation of data defined in standards (for example the K1 and K2 bytes could transport the switching protocol for automatic protection, the Di bytes could transport data communication channels) or proprietary data (for example "Media Dependent Bytes", "Byte Reserved for National Use", "Spare Byte", etc.).

Processing of the RS/Section and MS/Line overhead bytes even if there is no need of regeneration, grooming or consolidation operations could cause premature termination of these data. The STM-n/OC-n clear channel interconnection allows this type of data to pass through the nodes where no intrusive process is required.

But, at the present time, no protection system is provided for STM-N/OC-n clear channel connections even though a sort of protection is required for this type of switched entity to protect the transmission of the STM-n/OC-n from the source point to the destination point or even to protect any subnetwork connection of the STM-n/OC-n route.

SUMMARY OF THE INVENTION

The general purpose of the present invention is to remedy the above mentioned shortcomings by making available a method for protection of STM-n/OC-n clear channel connections.

Another purpose is to make available network elements and a subnetwork applying the protection method.

It was therefore sought to provide in accordance with the present invention a method for protection of clear channel communications of STM-N/OC-n signals between two network elements (11, 12) of a subnetwork in which one element comprises a transmitting end and the other a receiving end in the subnetwork; the method including the steps of duplicating the STM-n/OC-n signals at the transmitting end of the subnetwork, transmitting the duplicated signals over two different paths defined as work (13) and protection (14) and selecting the signals from the work path or the protection path at the receiving end of the subnetwork.

Again in accordance with the present invention it was sought to realize a clear channel subnetwork with protection of communications of STM-N/OC-n signals between two network elements (11, 12) in which one element constitutes a transmitting end and the other a receiving end in the subnetwork characterized in that the element at the transmitting end comprises a splitter for duplicating the STM-n/OC-n signals to be transmitted and means for routing the duplicated signals over two different paths in the subnetwork defined work (13) and protection (14) and in which the element at the receiving end of the subnetwork comprises a selector for selecting the signals from the work path or the protection path.

BRIEF DESCRIPTION OF THE DRAWINGS

To clarify the explanation of the innovative principles of the present invention and its advantages compared with the prior art there is described below with the aid of the annexed drawings possible embodiments thereof by way of non-limiting example applying said principles. In the drawings.

DETAILED DESCRIPTION OF THE PREFERRED EMBODIMENTS

Figure 1:
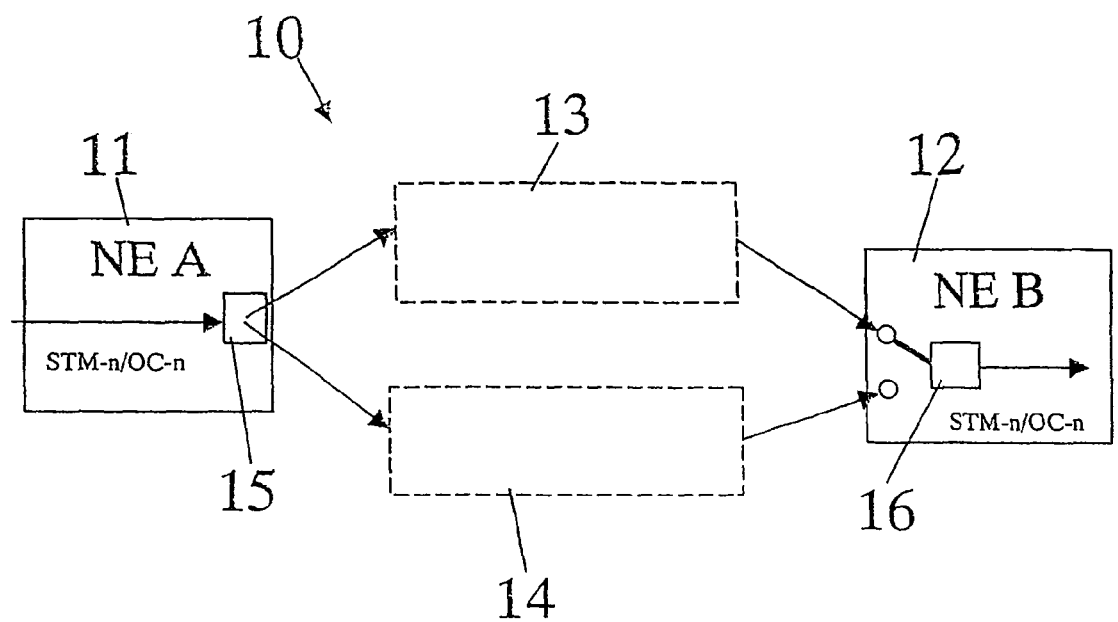
FIG. 1 shows a block diagram of a subnetwork applying the protection method of the present invention in normal or work state.

With reference to the figures, FIG. 1 shows a clear channel subnetwork designated as a whole by reference number 10 which connects with an STM-N/OC-n signal two network elements 11, 12 (NE A and NE B in FIG. 1). As the subnetwork is the clear-channel type, i.e. the connection is made through a number of network elements capable of realizing clear-channel connections, the STM-n/OC-n signal generated by NE A will reach NE B without change.

In accordance with the method, the protection diagram of the present invention calls for duplication of STM-n/OC-n signals at the transmitting end of the subnetwork (the NE A element) and the transmission on two different paths which can be defined work subnetwork 13 and protection subnetwork 14. For duplication the transmitting network element NE A will be equipped with an appropriate known signal duplicator 15 readily imaginable to those skilled in the art.

To ensure success of the protection scheme the work and protection channels will follow different routes.

The protection path can be used for permanent transmission of the STM-n/OC-n signal (1+1 protection) or for transmission of extra traffic in case of a protection event (1:1 protection), as defined in ITU-T G.841, revision 10/98.

At the receiving end of the subnetwork protection (element NE B) the signal will be selected from the work path or the protection path. The selection will be determined by the quality of the signals received (for example, if the signal is missing or deteriorated—SF or SD) the state of protection (i.e. the presence of a wait-to-restore time: see below) and/or external commands.

To make the selection, the network element NE B will be equipped with an appropriate selector 16 also known and readily imaginable to those skilled in the art.

Figure 2:
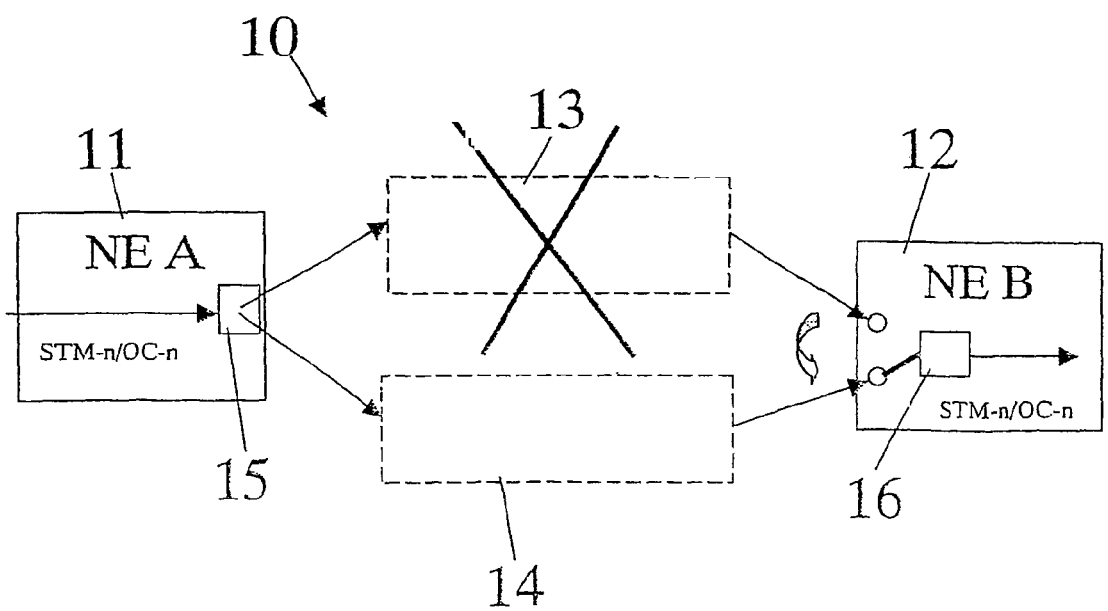
FIG. 2 shows the subnetwork of FIG. 1 in a protection state.

Under normal conditions, the signal will always be selected from the work path 13 (FIG. 1). In case of failure of the work path (interruption or unacceptable deterioration) the signal will be selected from the protection path (FIG. 2).

The selector 16 can operate in a mode with or without restore. The operating mode with restore requires that, after protection switching, the selector selects the STM-n/OC-n from the work path when the latter is restored. When the operating mode with restore is selected, a fixed time (wait-to-restore) must expire before the work channel is used again. The wait-to-restore time is programmable in the device.

The quality information is obtained by unintrusive monitoring performed by the selector on the STM-n/OC-n work and protection signals received.

As mentioned above, the selector can also respond to external commands which are used for example to prevent protection switching (protection lock) or to force the selector to select the signal from one or other of the two paths ("forced or manual switch to worker" and "forced or manual switch to protection").

A hierarchy is advantageously imposed between the signal conditions (i.e. SF or SD), the external commands and the protection state (i.e. the presence and passing of the wait-to-restore time).

In this manner, if more than one switching criteria are present simultaneously, the selector is controlled by the condition, state or external command with the highest priority.

Hence, the purposes set out have been achieved by making available an effective protection scheme for an STM-N/OC-n clear channel connection.

The protection scheme proposed for protection of the STM-n/OC-n clear channel signals transmitted from a source point to a destination point provides for overcoming any failure along the path between the source and destination points. In addition, it can be used in different types of network structure, for example ring or mesh.

As the signal is interconnected without any modification of the data transported by the overhead bytes, the protection scheme described is single-ended and no communication protocol (APS protocol) is necessary to align the two protection ends, local and remote, with the protection state.

The above description of embodiments applying the innovative principles of the present invention is given by way of non-limiting example of said principles within the scope of the exclusive right claimed here.

The invention claimed is:

1. A method of protecting clear channel communications of STM-n or OC-n signals, the signals comprising overhead comprising, in the case of STM-n signals, Regeneration Section Overhead and Multiplex Section Overhead bytes, and, in the case of OC-n signals, Section and Line overheads, between a transmitting network element and a receiving network element in a subnetwork, the method comprising the steps of:

duplicating, by the transmitting network element of the subnetwork, the STM-n or OC-n signals as duplicated signals at the transmitting network element of the subnetwork;

transmitting the duplicated signals over a work path and over a different protection path without changing the overhead by transmitting the duplicated signals without processing of the overhead, each of the work path and the protection path comprising at least one further network element; and selecting, by the receiving network element of the subnetwork, the duplicated signals from one of the work path and the protection path at the receiving network element of the subnetwork.

2. The method in accordance with claim 1, in which the selecting step is performed on the basis of at least one of the following criteria: quality of the duplicated signals received from the work and protection paths and state of the protection and external commands.

3. The method in accordance with claim 2, in which data on the quality of the duplicated signals received is obtained by means of unintrusive monitoring performed at the receiving network element.

4. The method in accordance with claim 2, in which the selecting step is performed by setting up a hierarchy among at least two of the criteria and, in case of simultaneous presence of a plurality of criteria, the selecting step is performed by controlling the criterion with the highest priority.

5. The method in accordance with claim 1, in which the protection path is used for permanent transmission of the STM-n or OC-n signal.

6. The method in accordance with claim 1, in which the protection path is used for transmission of extra traffic if protection is not required.

7. The method in accordance with claim 1, in which the selecting step is performed in a mode according to which, after the protection path has been selected due to failure of the work path, STM-n or OC-n signal is selected from the work path when the latter is restored.

8. The method in accordance with claim 7, in which a fixed time must expire before the work path is selected again.

9. A clear channel subnetwork for protecting communications of STM-n or OC-n signals, the signals comprising overhead comprising, in the case of STM-n signals, Regeneration Section Overhead and Multiplex Section Overhead bytes, and, in the case of OC-n signals, Section and Line overheads, between a transmitting network element and a receiving network element in the subnetwork, the subnetwork comprising:

the transmitting network element comprising a splitter for duplicating the STM-n or OC-n signals to be transmitted as duplicated signals, and means for routing the duplicated signals over a work path and a different protection path in the subnetwork without changing the overhead, the routing means including means for routing the duplicated signals without processing of the overhead, each of the work path and the protection path comprising at least one further network element; and the receiving network element of the subnetwork comprising a selector for selecting the duplicated signals from one of the work path and the protection path.

10. The subnetwork in accordance with claim 9, in which the selector selects the duplicated signals on the basis of at least one of quality of the duplicated signals received from the work and protection paths and a protection state and external commands.

11. The subnetwork in accordance with claim 9, in which the selector comprises means for, after a protection switching, selecting the STM-n or OC-n signals from the work path when the latter is restored.

12. The subnetwork in accordance with claim 11, in which a fixed time must expire before the work path is used again.

13. The subnetwork in accordance with claim 10, in which the selector comprises monitoring means for unintrusive monitoring of the quality of the STM-n or OC-n signals received on the work and protection paths.

14. The subnetwork in accordance with claim 10, in which the selector comprises means for responding to the external commands to do one of the following: prevent protection switching and force the selector to select the signal from a particular one of the work and protection paths.

15. The subnetwork in accordance with claim 10, in which the selector comprises hierarchy means for setting a hierarchy among criteria according to which the selector is controlled by the criterion with the highest priority in case of simultaneous presence of a plurality of criteria.

16. A communications network comprising a clear channel subnetwork for protecting communications of STM-n or OC-n signals, the signals comprising overhead comprising, in the case of STM-n signals, Regeneration Section Overhead and Multiplex Section Overhead bytes, and, in the case of OC-n signals, Section and Line overheads, between a transmitting network element and a receiving network element in the subnetwork, the subnetwork comprising:

the transmitting network element comprising a splitter for duplicating the STM-n or OC-n signals to be transmitted as duplicated signals, and means for routing the duplicated signals over a work path and a different protection path in the subnetwork without changing the overhead, the routing means including means for routing the duplicated signals without processing of the overhead, each of the work path and the protection path comprising at least one further network element; and the receiving network element of the subnetwork comprising a selector for selecting the duplicated signals from one of the work path and the protection path.

* * * * *